United States Patent [19]
Johnson et al.

[11] Patent Number: 6,110,254
[45] Date of Patent: Aug. 29, 2000

[54] METHOD FOR CHEMICAL PRECIPITATION OF METALLIC SILVER POWDER VIA A TWO SOLUTION TECHNIQUE

[75] Inventors: Christian E. Johnson, Middletown; Gery R. Stafford, Gaithersburg, both of Md.

[73] Assignee: The United States of America as represented by the Secretary of Commerce, Washington, D.C.

[21] Appl. No.: 09/256,073

[22] Filed: Feb. 24, 1999

[51] Int. Cl.$^7$ .................................................... C22B 11/10
[52] U.S. Cl. .............................. 75/741; 75/343; 75/371; 75/955; 423/28; 423/34
[58] Field of Search .............................. 75/741, 955, 371, 75/343; 423/28, 34; 210/719; 23/313 R

[56] References Cited

U.S. PATENT DOCUMENTS

| | | | |
|---|---|---|---|
| 3,997,328 | 12/1976 | Greener | 75/255 |
| 5,318,746 | 6/1994 | Lashmore et al. | 419/64 |
| 5,389,122 | 2/1995 | Glicksman | 75/741 |
| 5,516,355 | 5/1996 | Radhakrishnan | 75/351 |
| 5,711,866 | 1/1998 | Lashmore et al. | 205/687 |

*Primary Examiner*—Prince Willis
*Assistant Examiner*—Tima McGuthry-Banks
*Attorney, Agent, or Firm*—Stevens, Davis, Miller & Mosher

[57] ABSTRACT

A method for the chemical precipitation of metallic silver powder employs a two solution technique in which a solution of a tin salt and a solution of a silver salt are mixed in the presence of an inorganic or organic acid, alumina, an anionic surfactant, and a colloid to form a precipitation solution at a temperature and pH suitable to effect the chemical precipitation of silver. Almost 80% by weight of the precipitated powder agglomerate is less than 25 $\mu$m in diameter, and the individual powder particles which compose the agglomerate range in size from 0.2 to 2.0 $\mu$m. In addition to the favorable size distribution, silver particles precipitated in the presence of a gelatin colloid can be used with a minimal amount of sieving so that little work hardening is imparted to the particles. The powder can be annealed at a temperature of up to 750° C. for two hours in air with minimal sintering, and the acid-assisted hand consolidation of powder produced according to the present technique is capable of producing silver compacts which are nearly 80% dense. Advantageously, a hand consolidated silver compact which comprises the powder of the present invention equals or exceeds the transverse rupture strength, shear strength, creep, toughness, corrosion resistance, microleakage, and wear properties of conventional silver amalgam.

11 Claims, 3 Drawing Sheets

METHOD FOR CHEMICAL PRECIPITATION OF METALLIC SILVER POWDER VIA A TWO SOLUTION TECHNIQUE

The invention described herein may be manufactured, used, and licensed by the U.S. Government for governmental purposes without the payment of any royalties thereon.

BACKGROUND OF THE INVENTION

1. Field of the Invention

This invention relates generally to a method for the chemical precipitation of metallic silver powder. The invention relates more specifically to a method which employs a two solution technique to produce powder suitable for use as a mercury-free, metallic restorative in dental applications.

2. Discussion of the Prior Art

Conventional dental amalgams have enjoyed widespread and long-standing popularity as a result of their ability to undergo the transformation from a soft, putty-like state into a strong cohesive solid at ambient temperature, under low pressure, and within a short time duration. According to a 1993 Department of Health and Human Service report, 100 million dental restorative procedures which employed amalgam were performed in 1990. In 1991, the U.S. Bureau of Mines reported that approximately 44 metric tons (97,000 lbs) of mercury, which amounts to approximately 88 metric tons (184,000 lbs) of amalgam, was used annually by the dental profession. Assuming a current price of approximately $1,650/kg of amalgam, there is a potential annual dental industry market value of approximately $150 million.

Concern has arisen, however, over possible long-term health hazards which may be associated with the use of amalgams in dental applications. In the event the use of mercury-containing restoratives is curtailed, a mercury-free metallic restorative could capture a portion or all of the amalgam market.

Although many conventional metallic materials display mechanical properties, corrosion resistance, and biocompatibility not unlike or even better than those associated with dental amalgams, none of these materials combines these properties with the ability to undergo a transformation from a soft, putty-like state into a strong cohesive solid at ambient temperature, under low pressure, and within a short period of time. Therefore, any search for a metallic alternative to amalgams must address the problem of consolidating an easily deformable, very plastic material into a strong solid under the strict temperature, pressure, and time limitations imposed by common dental practice.

A technique for the consolidation of silver powders based on acid-assisted cold welding and intermetallic formation is described in U.S. Pat. No. 5,711,866. After treating the surface of the powder with a dilute acid to remove the naturally occurring oxide layer, the individual silver powders are cold-welded under low pressure to form a cohesive solid. Subsequently, a slurry consisting of the wet mixture of the surface treated powder particles is placed and consolidated in a prepared dental cavity. The liquid film surrounding each particle serves both to maintain a clean surface, and to constrain the micron-size particles, so that they present no inhalation danger to the patient. The powders are consolidated into a solid mass using instruments normally employed in dental practice. With silver powders having a size range of from 0.2 $\mu$m to 2.0 $\mu$m and the appropriate thermal anneal procedures, acid-assisted hand consolidation, using normal dental tools, is capable of producing silver compacts with a density of greater than 75%. Such hand consolidated silver equals or exceeds the transverse rupture strength, shear strength, creep, toughness, corrosion resistance and microleakage properties of conventional silver amalgam.

U.S. Pat. No. 3,997,328 discloses particles in the form of what is variously referred to as microcut material, lathe-cut material, platelets, or filings so that the particles are generally of non-smooth, irregular shape. The reference indicates that conventional microcutting, lathe-cutting, or filing techniques can be employed satisfactorily to obtain the irregularly shaped particles.

U.S. Pat. No. 5,318,746 discloses that metallic powders have two basic forms, either minute lathe-cut filings, or atomized, spherical particles. The lathe-cut filings are subsequently milled and sifted to produce the desired particle size. The length of particles in a commercial lathe-cut alloy might range from 60–120 $\mu$m long, 10–70 $\mu$m wide and from 10–35 $\mu$m thick. The reference discloses that spherical particles, produced by means of an atomizing process whereby a spray of tiny drops is allowed to solidify in an inert gaseous (e.g., argon) or liquid (e.g., water) environment, have a maximum size between 40 and 50 $\mu$m. The preferred size of particles to be employed in the process disclosed by the reference is from about 0.5 $\mu$m to about 50 $\mu$m.

A general need exists to provide the dental profession with a mercury-free metallic restorative as an alternative to conventional dental amalgams. The restorative must be capable of being hand consolidated while retaining critical mechanical properties, and of being placed in a dental cavity in the same amount of time as that required to place an amalgam. To make possible techniques such as the aforementioned acid-assisted consolidation, a more specific need exists for a method of preparing a silver powder of the required particle size.

SUMMARY OF THE INVENTION

It is an object of the present invention to provide a method for the chemical precipitation of metallic silver powder. It is a further object of the present invention to provide a method which produces silver powder having a particle size that facilitates its hand consolidation for use in dental restoratives.

Accordingly, the present invention advantageously relates to a method which employs a two solution technique to produce a silver powder having the desired particle size distribution. The method comprises forming a mixture of a solution of a tin salt and a solution of a silver salt in the presence of an inorganic or organic acid, alumina, an anionic surfactant, and a colloid to form a precipitation solution at a temperature and pH suitable to effect the chemical precipitation of silver. The precipitated powder agglomerate is primarily (almost 80% by weight) less than 25 $\mu$m in diameter, and the individual powder particles which compose the agglomerate range in size from 0.2 to 2.0 $\mu$m. In an optional subsequent process step, the precipitated particles can be heat treated in air at a temperature ranging from 450 to 750° C.

A hand consolidated silver restorative prepared from the powder of the present invention equals or exceeds the transverse rupture strength, shear strength, creep, toughness, corrosion resistance, microleakage, and wear properties of conventional silver amalgam.

BRIEF DESCRIPTION OF THE DRAWINGS

Other objects, features, and advantages of the present invention will become more fully apparent from the following detailed description of the preferred embodiments, the appended claims, and the accompanying drawings. As depicted in the attached drawings:

DESCRIPTION OF THE PREFERRED EMBODIMENTS

Figure 1:
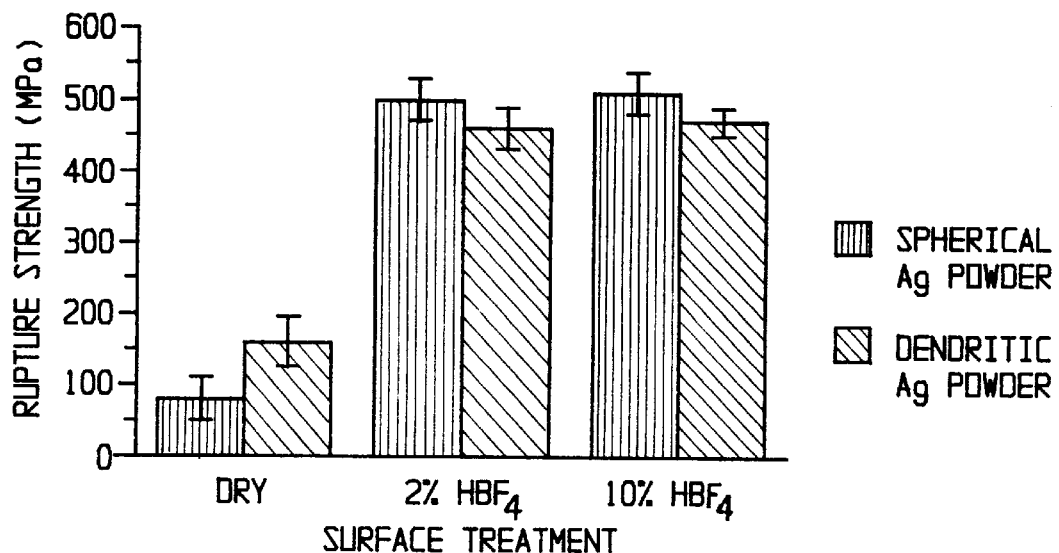
FIG. 1 is a graphical representation of the effect of acid-assisted consolidation on the transverse rupture strength of silver compacts.

The present invention will be disclosed in terms of the currently perceived preferred embodiments thereof The present invention is based on the ability of silver surfaces to adhere to each other after being treated in dilute acid. Silver particles that have been immersed in dilute acid can be condensed into cohesive solids, and display transverse rupture strength values significantly superior to that attained by pressing untreated powder, as depicted in FIG. 1. The ability to condense surface-treated silver powder into a cohesive solid displaying reasonable mechanical properties, as well as the established and approved use of silver as a dental restorative material, clearly suggests that a silver-based material is a likely candidate for a mercury-free substitute to dental amalgams.

The inventors have developed procedures and powder properties that facilitate the hand consolidation of material having properties which compare favorably to those of conventional dental amalgam. A range of particle sizes has been developed and a pre-consolidation thermal treatment has been established which promotes consolidation but does not adversely affect powder handling. Silver powder of the required particle size is best obtained through the present two solution precipitation process.

While investigating the immersion deposition of silver onto tin in which $Ag^+$ is reduced by the oxidative dissolution of tin, the inventors observed that $Sn^{+2}$ can be further oxidized to $Sn^{+4}$, resulting in additional $Ag^+$ reduction and the precipitation of finely-divided silver. The chemistry most to extensively explored in this study consists of a mixture of a silver salt and a tin salt in a 1.0 mol/l acid solution. The following reactions occur

$$Sn^{2+} \rightarrow Sn^{4+} + 2e^- \quad (1)$$

$$2Ag^+ + 2e^- \rightarrow 2Ag \quad (2)$$

and yield a metallic silver precipitate with a small particle size and an irregular morphology.

The acid is an inorganic or organic acid and can be selected from the group consisting of fluoroboric acid, acetic acid, perchloric acid, phosphoric acid, sulfamic acid, and sulfuric acid, with fluoroboric acid being preferred. The silver salt can be selected from the group consisting of silver nitrate, silver oxide, silver fluoroborate, silver fluoride, silver perchlorate, silver sulfamate, and silver sulfate, with silver nitrate being preferred. The tin salt can be selected from the group consisting of tin fluoroborate, tin fluoride, and tin sulfate, with tin fluoroborate being preferred.

In order to ensure the deposition of pure silver, the concentrations of the reactive species and the pH of the solution must be properly adjusted. Too high a tin ion concentration or an inappropriate pH may lead to the formation of tin oxide in the solution and its precipitation and incorporation into the silver. Thermodynamically, it may be possible to have some underpotential deposition of tin where silver-rich, Ag—Sn intermetallics are formed. The free energy associated with the formation of the Ag—Sn intermetallic increases the $Sn^{2+} \rightarrow Sn(Ag)$ reduction potential so that this side reaction may, in principle, occur.

Figure 2:
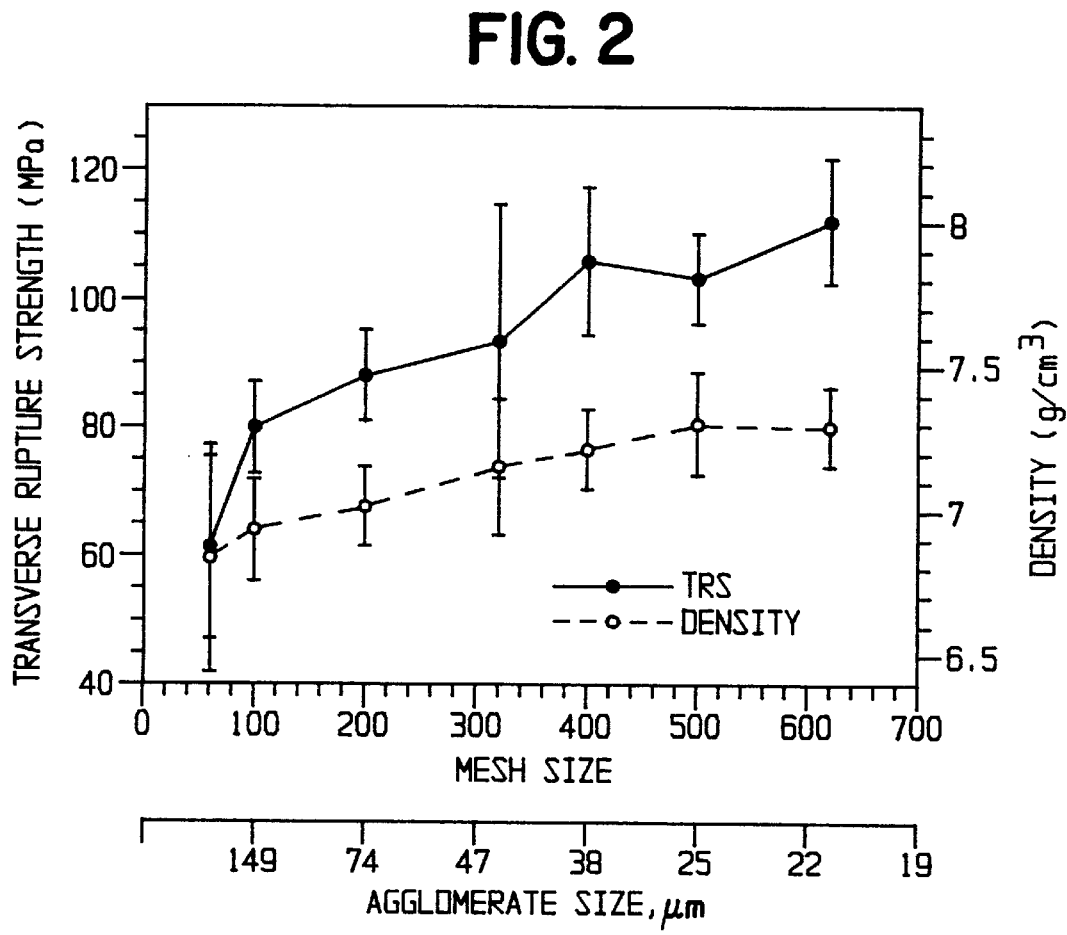
FIG. 2 is a graphical representation of the effect of particle size on the transverse rupture strength and density of hand-consolidated compacts.

Of those properties which best promote hand consolidation, one of the most important parameters is the agglomerate size of the silver powder. As illustrated in FIG. 2, a dramatic increase in both the transverse rupture strength and density of hand consolidated samples can be achieved as the maximum agglomerate size of the silver powder is decreased. A statistically insignificant increase in the rupture strength is observed when the largest agglomerate size is reduced from 25 to 21 μm. These results clearly indicate that an agglomerate size greater than about 40 μm should be avoided.

Further, the precipitation process should be optimized so that an agglomerate particle size of less than 40 μm can be obtained, preferably without sieving. Fractional sieving is time consuming, can damage the silver by introducing workhardening to an otherwise ductile material, and promotes the cold welding of small particles into larger agglomerates. For these reasons there is a lower limit to the maximum agglomerate size one can achieve using progressive sieving.

Typical solution chemistries for silver precipitation are shown in Table 1.

TABLE 1

| Solution composition used for the precipitation of silver. | | |
|---|---|---|
|  | Solution A | Solution B |
| Silver Nitrate | 0.433 mol/l | 0.433 mol/l |
| Fluoroboric Acid | 1.000 mol/l | 1.000 mol/l |
| Anionic Surfactant | 3.9 × $10^{-5}$ mol/l | 3.9 × $10^{-5}$ mol/l |
| Alumina (γ-0.05 μm) | 0.0033 mol/l | 0.0033 mol/l |
| Tin Fluoroborate | 0.210 mol/l | 0.210 mol/l |
| Ag/Sn Ratio | 2.062 | 2.062 |
| pH | 0.4 | 0.4 |
| Temperature | 21° C. | 21° C. |
| Agitation | Mechanical (Stir Bar) | Mechanical (Stir Bar) |
| Colloid (Gelatin) | 0 ppm | 15 ppm |

Figure 3A:
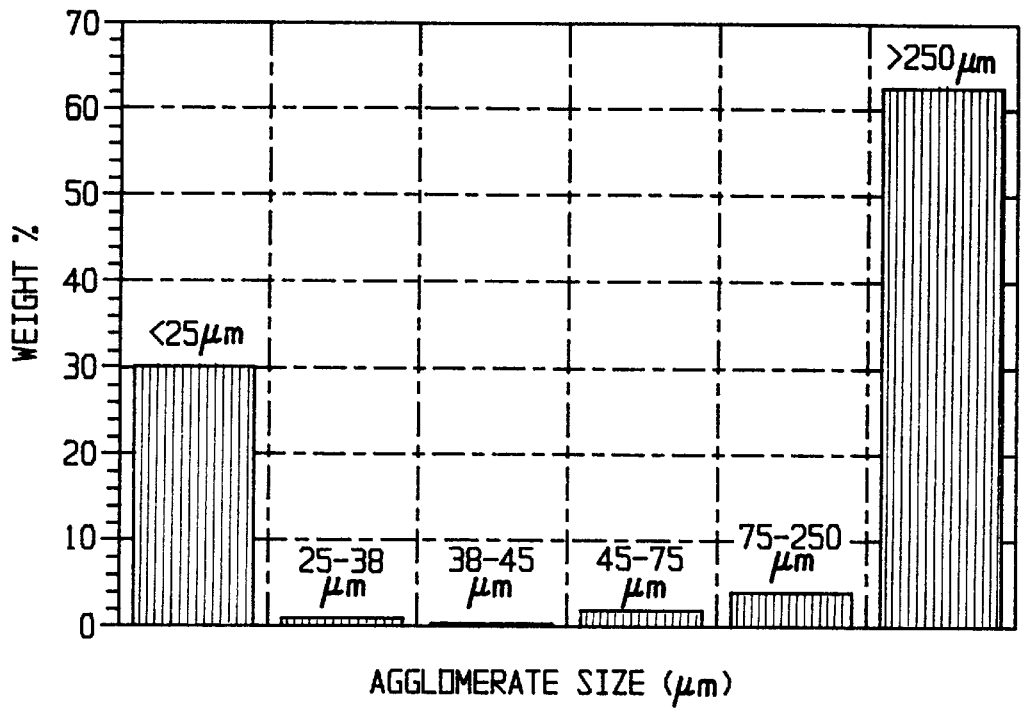
FIG. 3A is a graphical representation of the agglomerate size distribution of precipitated silver powder using the precipitation formulation of Table 1, Solution A.

Alumina is added to the precipitation solution to inhibit clumping during precipitation and to retard sintering of powders when heat treated at elevated temperature. A surfactant, such as sodium 2-ethylhexyl sulfate (Niaproof Anionic Surfactant 08), is added to disperse the alumina during powder precipitation and to inhibit clumping of the precipitated powders. The early stages of precipitation produce particles which range in size from 0.2 to 2 μm. By the time these particles are collected, however, they are generally fused into agglomerates which vary significantly in size. These agglomerates are likely formed during the middle to latter stages of precipitation where existing particles act as nucleation sites and promote branching. As depicted in FIG. 3A, the silver powder formed from Solution A has a bimodal distribution of particle sizes, with 62 wt. % of the agglomerates being greater than 250 μm in size, and 30 wt. % of the agglomerates being less than 25 μm.

Figure 3B:
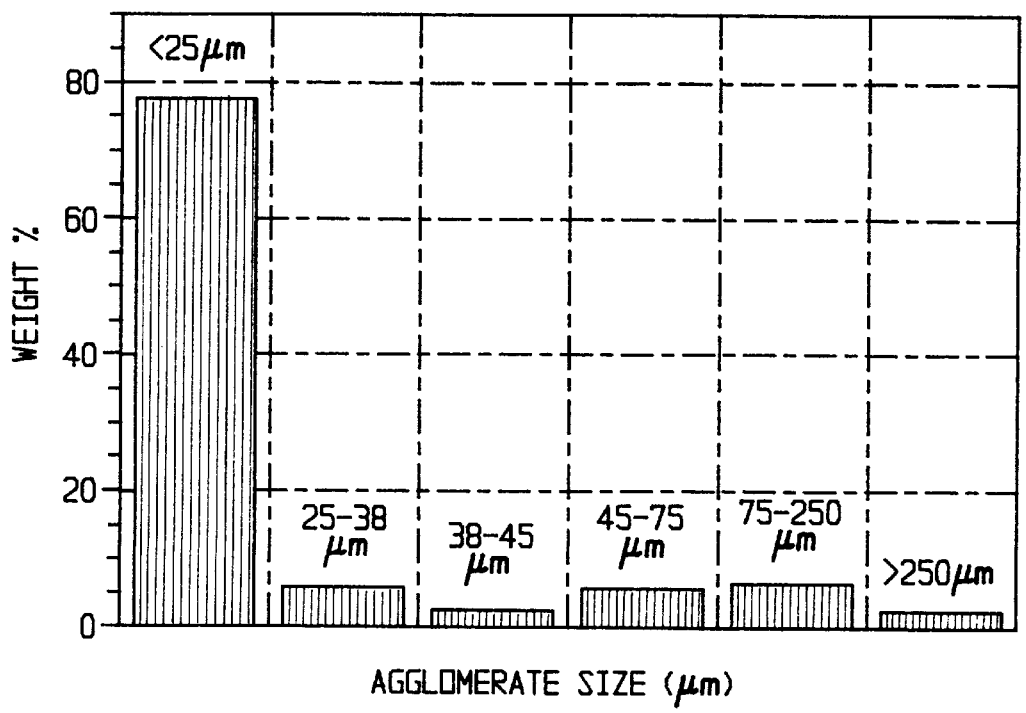
FIG. 3B is a graphical representation of the agglomerate size distribution of precipitated silver powder using the precipitation formulation of Table 1, Solution B.

Since the larger particles negatively impact the transverse rupture strength and density of hand consolidated compacts, the solution chemistry was altered in order to promote the precipitation of smaller agglomerates. As depicted in Table 1, Solution B has the same composition as Solution A except for the inclusion of 15 ppm of a gelatin colloid. As illustrated by FIG. 3B, the addition of the gelatin dramatically alters the size distribution in favor of the smaller agglomerates which are less than 25 μm in size. As a result of the presence of the gelatin, nearly 80 wt. % of the agglomerates is less than 25 μm in size. It is believed that the addition of gelatin favors the nucleation of new particles and inhibits the formation of large particles, presumably by adsorbing on the surface and inhibiting growth and/or consolidation. In addition to the favorable size distribution, silver particles precipitated in the presence of gelatin can be used with a minimal amount of sieving so that little work hardening is imparted to the particles.

In a subsequent process step, the silver powder produced according to the invention can be annealed prior to consolidation, thus dramatically improving the transverse rupture strength of the compact. This result has been attributed to a reduction in the yield strength of the silver powder prior to consolidation. Differential thermal analysis reveals that the thermal anneal in air oxidizes contaminants on the silver surface. The removal of the contaminant allows a uniform, protective oxide to form upon cooling. Since silver oxide is unstable at temperatures above 300° C., however, the annealing step can promote sintering of the silver powder at the elevated temperatures once the protective oxide is removed.

To determine if the precipitated powder from the present invention differed from commercially available silver powder when heat treated, a comparison was made with atomized 18 μm size powder and a commercial 1 to 3 μm size powder. The powders were then heat treated at 750° C. for 2 hours in air. Annealing at this temperature rendered the commercial 18 μm and 1 to 3 μm powders useless due to sintering into a semi-solid mat.

Figure 4:
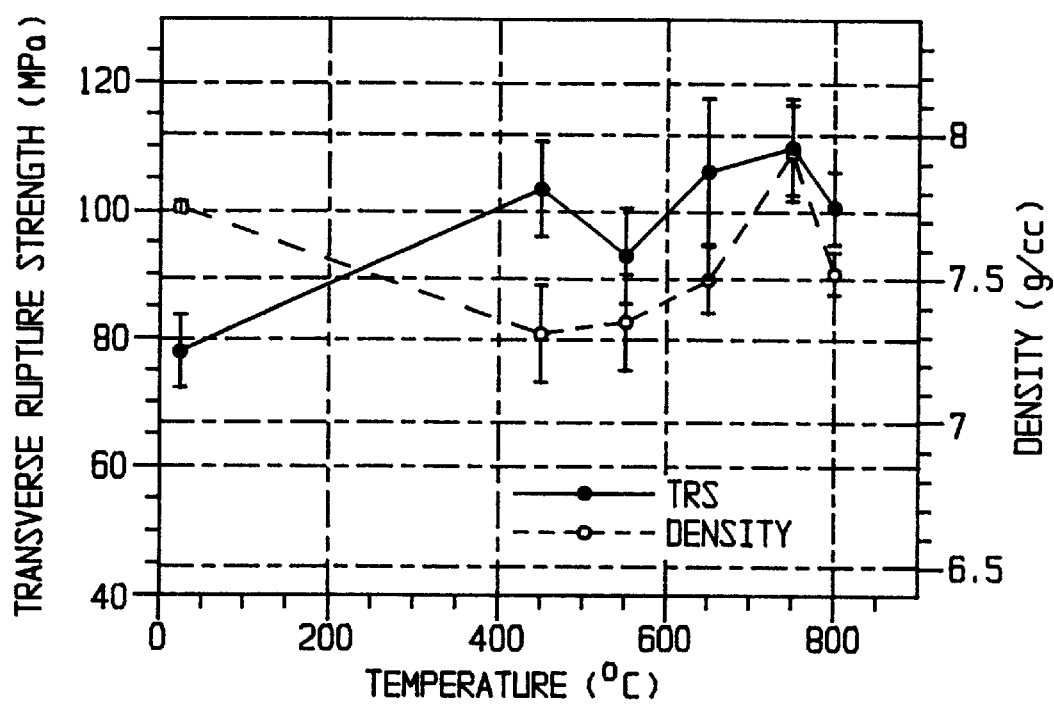
FIG. 4 is a graphical representation of the effect of annealing temperature on the transverse rupture strength and density of hand-consolidated compacts using the precipitation formulation of Table 1, Solution B.

Sintering is not a problem, however, for powder of the present invention which has been precipitated using the Solution B chemistry summarized in Table 1. More than 95% of the Solution B precipitated powder passed through a 200 mesh sieve. In FIG. 4, where both density and transverse rupture strength of hand consolidated compacts are plotted as a function of annealing temperature, the benefit of the annealing step on the transverse rupture strength is clearly evident. On average, annealed powder results in at least a 25% increase in transverse rupture strength. The density of the consolidated material also changes significantly due to the annealing step. The density is clearly influenced by two factors: the yield strength of the silver and the extent of powder sintering. The unannealed samples show relative high density but low strength. The powders are uniform and not agglomerated, giving rise to fairly easy packing. The silver surface, however, is still contaminated so the degree of cold welding is reduced. Annealing the powder does result in some sintering and agglomeration (as verified by BET) and the density of these samples drops dramatically. As the annealing temperature is increased, the density steadily increases, presumably due to the reduced yield strength of the silver. A preferred temperature range for the thermal anneal is from 450 to 750° C., with a more preferred range of from 650 to 750° C., since the 750° C. anneal results in compacts having the highest density and rupture strength.

The silver powder obtained from the Solution B chemistry of Table 1 has all of the properties required for hand consolidation under clinical conditions. Nearly 80% of the powder is less than 25 μm in size, and this particle size distribution is not significantly altered by the high temperature anneal. This was achieved by adding alumina, a surfactant, and a colloid to the basic precipitation chemistry. A three-factorial experimental design was used to investigate the impact that each of these components and combination of components have on powder sieving, powder handling during consolidation, and properties (density and transverse rupture strength) of hand consolidated silver compacts. The results are illustrated in Table 2. The component elements were ranked in order for i) ease of sieving; ii) consolidation density; and iii) transverse rupture strength.

TABLE 2

Addition component Evaluation from Experimental Design
(Surfactant - 0.03 ml/l; Alumina - 334 mg/l; Colloid - 15 ppm).

| Rank | Ease of Sieving | Density | TRS |
|---|---|---|---|
| 1 | All | Surfactant Only (7.83 ± .03) | No additions (122.9 ± 14.7) |
| 2 | Colloid Plus Al$_2$O$_3$ | Colloid Plus Al$_2$O$_3$ (7.70 ± .07) | Surfactant Only (121.2 ± 5.5) |
| 3 | Colloid Plus Surfactant | Al$_2$O$_3$ only (7.67 ± .14) | Colloid Plus Al$_2$O$_3$ (117.0 ± 11.2) |
| 4 | Colloid Only | All (7.62 ± .21) | All (115.3 ± 11.5) |
| 5 | Al$_2$O$_3$ Plus Surfactant | No additions (7.59 ± .15) | Al$_2$O$_3$ only (113.6 ± 3.9) |
| 6 | Al$_2$O$_3$ Only | Colloid Only (7.56 ± .09) | Colloid Only (106.3 ± 8.4) |
| 7 | Surfactant Only | Colloid Plus Surfactant (7.54 ± .11) | Colloid Plus Surfactant (105.3 ± 12.8) |
| 8 | No additions | Al$_2$O$_3$ Plus Surfactant (7.14 ± .03) | Al$_2$O$_3$ Plus Surfactant (94.9 ± 3.1) |

The ease of sieving coincides with the addition of the colloid to the precipitation solution, with the solution containing all of the additions rated best. Little sieving effort is required to obtain 200 mesh powder where 93% by weight of the dried as-precipitated powder passes through 200 mesh. For ease of sieving, the top four ranked additions to the precipitation solution contained the colloid. The addition of the colloid promotes powder uniformity during precipitation and significantly minimizes the need for sieving.

The highest density was achieved when only the surfactant was added to the precipitation solution and the highest transverse rupture strength value was achieved with no additions. In both cases, more extensive sieving is required just to achieve 200 mesh powder than was noted for powder precipitated from a solution containing the colloid and alumina. More extensive sieving is defined as sieving which requires a longer period of time and applied energy to break up the agglomerated clumps from the dried precipitate. The precipitated powder from the Solution B chemistry in Table 1, designated as "All," was ranked fourth in both density and transverse rupture strength. The lowest ranked component combination, alumina plus surfactant, was from Solution A. No dramatic statistical significance can be attributed to any one component or combination of components except possibly the lowest ranked combination, Solution A. This may be attributable to either the concentration level used for each component in the evaluation, or to the possible overshadowing of the effects that an individual component or combination of components may have by the technique sensitivity of the hand consolidation.

EXAMPLE

The best mode of practicing the invention is exemplified by the following procedure in which one liter of precipitation solution yielded 42 grams of silver powder.

To produce a first solution, 15 mg of a gelatin colloid was dissolved in 790 ml of distilled water. The solution was acidified to a pH of approximately 0. by the addition of 1 mol (134 ml) of fluoroboric acid ($HBF_4$), 48% mass fraction. Then, 0.433 mol (73.5 g) of silver nitrate ($AgNO_3$) was dissolved in the solution, followed by the addition of 0.03 ml of anionic surfactant and 335 mg of aluminum oxide ($Al_2O_3$—γ) having a particle size of 0.05 μm. A second solution comprising 0.210 mol (76 ml) of tin fluoroborate concentrate (800 g/l $Sn(BF_4)_2$) was then added to the first solution at ambient temperature (19–21° C.).

Colloidal silver was observed to form in approximately 3 seconds, and coarsening of the silver powder continued for approximately 20 minutes. After the powder was allowed to settle in solution for approximately 10 minutes, the liquid was decanted from the powder and the powder was washed in distilled water. The silver powder was then air dried and sieved through 200 mesh resulting in powder agglomerates having a size of approximately 25 to 75 μm, and comprising individual particles having a size of from 0.2 to 2.0 μm.

The present invention, therefore, provides a metallic silver powder which is chemically precipitated through a two solution technique. The precipitated powder agglomerate is primarily (almost 80% by weight) less than 25 μm in diameter, and the individual powder particles which compose the agglomerate range in size from 0.2 to 2.0 μm. In addition to the favorable size distribution, silver particles precipitated in the presence of gelatin can be used with a minimal amount of sieving so that little work hardening is imparted to the particles. The powder can be annealed at a temperature of up to 750° C. for two hours in air with minimal sintering. The acid-assisted hand consolidation of powder produced according to the present technique is capable of producing silver compacts which are nearly 80% dense. Advantageously, a hand consolidated silver compact which comprises the powder of the present invention equals or exceeds the transverse rupture strength, shear strength, creep, toughness, corrosion resistance, microleakage, and wear properties of conventional silver amalgam.

While only certain preferred embodiments of this invention have been shown and described by way of illustration, many modifications will occur to those skilled in the art. It is, therefore, desired that it be understood that it is intended herein to cover all such modifications that fall within the true spirit and scope of this invention.

What is claimed is:

1. A method for the chemical precipitation of metallic silver powder via a two solution technique, comprising the steps of:

forming a first solution by dissolving in distilled water an amount of a colloid sufficient to promote formation of particles of a desired size;

acidifying said first solution by adding an inorganic or organic acid;

dissolving in said first solution a silver salt;

adding to said first solution an amount of alumina sufficient to inhibit clumping of particles during precipitation and to retard sintering of particles;

adding to said first solution an amount of an anionic surfactant sufficient to disperse said alumina during precipitation and to inhibit clumping of particles during precipitation;

forming a second solution of a tin salt;

adding said second solution to said first solution to form a precipitation solution in which the ion concentration ratio of silver to tin is approximately 2.0 at a temperature appropriate to effect the chemical precipitation of silver;

agitating said precipitation solution for a period of time sufficient to precipitate silver powder agglomerates in which from 30% to 80% of the agglomerates have an agglomerate diameter of less than 25 μm, and in which said agglomerates comprise individual powder particles having a diameter of from 0.2 to 2.0 μm; and optionally heat treating said silver powder particles.

2. A method for the chemical precipitation of metallic silver powder according to claim 1, wherein said acid is selected from the group consisting of fluoroboric acid, acetic acid, perchloric acid, phosphoric acid, sulfamic acid, and sulfuric acid.

3. A method for the chemical precipitation of metallic silver powder according to claim 1, wherein said silver salt is selected from the group consisting of silver nitrate, silver oxide, silver fluoroborate, silver fluoride, silver perchlorate, silver sulfamate, and silver sulfate.

4. A method for the chemical precipitation of metallic silver powder according to claim 1, wherein said tin salt is selected from the group consisting of tin fluoroborate, tin fluoride, and tin sulfate.

5. A method for the chemical precipitation of metallic silver powder according to claim 1, wherein said colloid is a gelatin.

6. A method for the chemical precipitation of metallic silver powder according to claim 1, wherein said anionic surfactant is 2-ethylhexyl sulfate.

7. A method for the chemical precipitation of metallic silver powder according to claim 1, wherein said first solution has a pH of approximately 0.8 after the addition of said acid.

8. A method for the chemical precipitation of metallic silver powder according to claim 1, wherein said precipitation solution has a temperature of approximately 19–21° C.

9. A method for the chemical precipitation of metallic silver powder according to claim 1, wherein said first solution has a silver salt concentration of approximately 0.4 mol/l.

10. A method for the chemical precipitation of metallic silver powder according to claim 1, wherein said second solution has a tin salt concentration of approximately 0.2 mol/l.

11. A method for the chemical precipitation of metallic silver powder via a two solution technique, comprising the steps of:

forming a first solution by dissolving in distilled water an amount of a colloid sufficient to promote formation of particles of a desired size;

acidifying said first solution by adding an inorganic or organic acid;

dissolving in said first solution a silver salt;

adding to said first solution an amount of alumina sufficient to inhibit clumping of particles during precipitation and to retard sintering of particles;

adding to said first solution an amount of an anionic surfactant sufficient to disperse said alumina during precipitation and to inhibit clumping of particles during precipitation;

forming a second solution of a tin salt;

adding said second solution to said first solution to form a precipitation solution in which the ion concentration ratio of silver to tin is approximately 2.0 at a temperature appropriate to effect the chemical precipitation of silver;

agitating said precipitation solution for a period of time sufficient to precipitate silver powder agglomerates in which from 30% to 80% of the agglomerates have an agglomerate diameter of less than 25 $\mu$m, and in which said agglomerates comprise individual powder particles having a diameter of from 0.2 to 2.0 $\mu$m; and heat treating said silver powder particles in air at a temperature ranging from 450 to 750° C.

* * * * *